United States Patent
Nishida et al.

(10) Patent No.: US 11,130,499 B2
(45) Date of Patent: Sep. 28, 2021

(54) FAILURE DETECTION DEVICE FOR AN EXTERNAL SENSOR AND A FAILURE DETECTION METHOD FOR AN EXTERNAL SENSOR

(71) Applicant: HITACHI, LTD., Tokyo (JP)

(72) Inventors: Takehisa Nishida, Tokyo (JP); Mariko Okude, Tokyo (JP); Kazuo Muto, Tokyo (JP)

(73) Assignee: HITACHI, LTD., Tokyo (JP)

(*) Notice: Subject to any disclaimer, the term of this patent is extended or adjusted under 35 U.S.C. 154(b) by 20 days.

(21) Appl. No.: 16/688,655

(22) Filed: Nov. 19, 2019

(65) Prior Publication Data
US 2020/0207362 A1   Jul. 2, 2020

(30) Foreign Application Priority Data
Dec. 26, 2018  (JP) .............................. JP2018-242370

(51) Int. Cl.
*B60W 50/00* (2006.01)
*B60W 50/029* (2012.01)
*B60W 50/02* (2012.01)

(52) U.S. Cl.
CPC ..... *B60W 50/029* (2013.01); *B60W 2050/021* (2013.01)

(58) Field of Classification Search
CPC ......... B60W 50/029; B60W 2050/021; B60W 50/0205; B60W 2555/20; B60W 2556/10;
(Continued)

(56) References Cited

U.S. PATENT DOCUMENTS

2016/0001781 A1* 1/2016 Fung ...................... B60K 28/02
                                                          701/36
2017/0341658 A1* 11/2017 Fung .................... G06K 9/6267

FOREIGN PATENT DOCUMENTS

DE      102016203833 A1    9/2017
EP          2787497 A1    10/2014
(Continued)

OTHER PUBLICATIONS

Extended European Search Report dated Jun. 4, 2020 for the European Patent Application No. 19212167.1.

*Primary Examiner* — Ian Jen
(74) *Attorney, Agent, or Firm* — Volpe Koenig (57) ABSTRACT

A failure detection device that detects a failure in a plurality of external sensors onboard a vehicle, the failure detection device comprises: an overlapping region storage unit that stores an overlapping region of detection areas of the external sensors; an environment performance storage unit that stores an environment-dependent performance of sensing of the external sensors; an environment information acquisition unit that acquires environment information about the vehicle; a recognition result comparison unit that compares recognition results of an object in the overlapping region from the external sensors; a failure likelihood computation unit that computes a failure likelihood of each external sensor based on a comparison result of the recognition results, the environment information, and the environment-dependent performance; and a failure determination unit that determines a failure in each external sensor based on the failure likelihood of each of the external sensors.

11 Claims, 7 Drawing Sheets

(58) Field of Classification Search
CPC ......... B60W 2556/50; B60W 2556/55; B60W 2420/42; B60W 2420/52; B60W 2420/62; B60W 60/00186; B60W 60/00182; B60W 50/032; B60W 2050/0292; B60W 50/023; B60W 2050/0215; G07C 5/0808
See application file for complete search history.

(56) References Cited

FOREIGN PATENT DOCUMENTS

| | | |
|---|---|---|
| JP | 2017-132285 A | 8/2017 |
| WO | 2017/218563 A1 | 12/2017 |

\* cited by examiner

| ENVIRONMENT \ EXTERNAL SENSOR | CAMERA | LASER RANGEFINDER | MILLIMETER-WAVE RADAR |
|---|---|---|---|
| RAINY, CLOUDY | B | B | A |
| FOGGY | C | C | A |
| NIGHTTIME | B | A | A |
| TUNNEL EXIT | C | B | A |
| INTENSE GLARE OF AFTERNOON SUN | C | A | A |
| PEDESTRIAN DETECTION | A | A | B |
| OBJECT DEPENDENCY | B | C | C |
| INTERFERENCE | A | C | C |

| PRESENCE OF FOG | DETECTION | ENVIRONMENT PERFORMANCE | FAILURE LIKELIHOOD |
|---|---|---|---|
| EXTERNAL SENSOR 3a (MILLIMETER-WAVE RADAR) | YES | A | ±0 |
| EXTERNAL SENSOR 3b (CAMERA) | NO | C | +1 |

FIG. 6B

| NIGHTTIME | DETECTION | ENVIRONMENT PERFORMANCE | FAILURE LIKELIHOOD |
|---|---|---|---|
| EXTERNAL SENSOR 3a (MILLIMETER-WAVE RADAR) | YES | A | +1 |
| EXTERNAL SENSOR 3b (CAMERA) | NO | B | +10 |

FAILURE DETECTION DEVICE FOR AN EXTERNAL SENSOR AND A FAILURE DETECTION METHOD FOR AN EXTERNAL SENSOR

CLAIM OF PRIORITY

The present application claims priority from Japanese patent application serial no. 2018-242370 filed on Dec. 26, 2018, the contents of which are hereby incorporated by reference into this application.

BACKGROUND OF THE INVENTION

1. Field of the Invention

The present invention relates to a failure detection device for an external sensor that recognizes the environment surrounding a moving object such as an automobile, and a failure detection method for an external sensor.

2. Description of the Related Art

A moving object such as an automobile acquires environment information, such as the road conditions, weather, and the position of the moving object itself, through a plurality of external sensors. Additionally, technology has been developed in which all or part of the control of the travel of a vehicle is automated based on recognition results from these external sensors. In such a vehicle, a fusion of recognition results from each of the external sensors is used to recognize the external environment and generate environment information.

On the other hand, in the case of using a plurality of different types of external sensors with different sensing principles in combination with each other, the performance of each external sensor differs depending on the conditions of the environment, and each external sensor has favorable conditions and unfavorable conditions in which to operate. For this reason, in certain environments, one external sensor may be capable of recognizing the surrounding environment, while another external sensor may be incapable of recognizing the surrounding environment.

JP 2017-132285 A describes a technology related to fusion that accounts for the environment-dependent performance of each external sensor. For example, according to claim 1 of JP 2017-132285 A, "one fusion specification corresponding to the external environment of the vehicle is selected from among a plurality of fusion specifications, a region where the recognition accuracy of the sensors is lowered because of the external environment in the selected fusion specification is presented to the driver as a weak point region of the selected fusion specification, the recognition results of the plurality of sensors are fused based on the selected fusion specification to recognize the external conditions of the vehicle, and automatic travel of the vehicle is achieved".

SUMMARY OF THE INVENTION

In JP 2017-132285 A, by selecting a fusion specification in advance according to the external environment, the influence of a sensor or sensors whose recognition accuracy is thought to be reduced is removed. At this time, the driver is encouraged to be careful, and operations such as following the preceding vehicle and changing lanes are automated with complementary and judgment operations according to visual confirmation by the driver. For this reason, in a case where the recognition accuracy of a certain sensor is thought to be reduced, the influence of the sensor is removed even if the sensor is actually successful in correctly recognizing a target object, thereby necessitating driver intervention and limiting the automation of driving to a subset of functions. Consequently, the effect of achieving automatic driving without driver intervention is limited to only the cases in which the environment is not unfavorable for any of the sensors.

Accordingly, an object of the present invention is to provide technology that extends the cruisable distance of automatic driving without driver intervention.

According to solve the above problem, there is provided a failure detection device that detects a failure in a plurality of external sensors onboard a vehicle, the failure detection device including: an overlapping region storage unit that stores an overlapping region of detection areas of the plurality of external sensors; an environment performance storage unit that stores an environment-dependent performance of sensing of the plurality of external sensors; an environment information acquisition unit that acquires environment information about the vehicle; a recognition result comparison unit that compares recognition results of an object in the overlapping region from the plurality of external sensors; a failure likelihood computation unit that computes a failure likelihood of each of the external sensors based on comparison results of the recognition results, the environment information, and the environment-dependent performance; and a failure determination unit that determines a failure in each of the external sensors based on the failure likelihood of each of the plurality of external sensors.

Further, according to solve the above problem, there is provided a failure detection device that detects a failure in a plurality of external sensors onboard a vehicle, the failure detection device including: an overlapping region storage unit that stores an overlapping region of detection areas of the plurality of external sensors; an environment performance storage unit that stores an environment-dependent performance of sensing of the plurality of external sensors; an environment information acquisition unit that acquires environment information about the vehicle; a recognition result comparison unit that compares recognition results of an object in the overlapping region from the plurality of external sensors; a failure likelihood computation unit that computes a failure likelihood of each of the external sensors based on comparison results of the recognition results, the environment information, and the environment-dependent performance; and a driving mode determination unit that determines one or more driving modes of automatic driving adoptable by the vehicle based on the failure likelihood of each of the plurality of external sensors.

According to the present invention, even in an environment that is unfavorable for recognition by a certain sensor, a sensing abnormality is first determined in the case where a comparison of recognition results among the sensors is different. Furthermore, from the environment performance of each sensor, it is distinguished whether the sensing abnormality is temporary or a sensor failure. With this arrangement, it is possible to extend the cruisable distance of automatic driving without driver intervention.

Other objects, configurations and advantages of the invention will become apparent from the following description of embodiments.

DESCRIPTION OF THE PREFERRED EMBODIMENTS

Embodiments of the present invention will be described below with reference to the accompanying drawings.

First Embodiment

A failure detection device 1 according to a first embodiment of the present invention will be described according to FIGS. 1 to 7.

Figure 1:
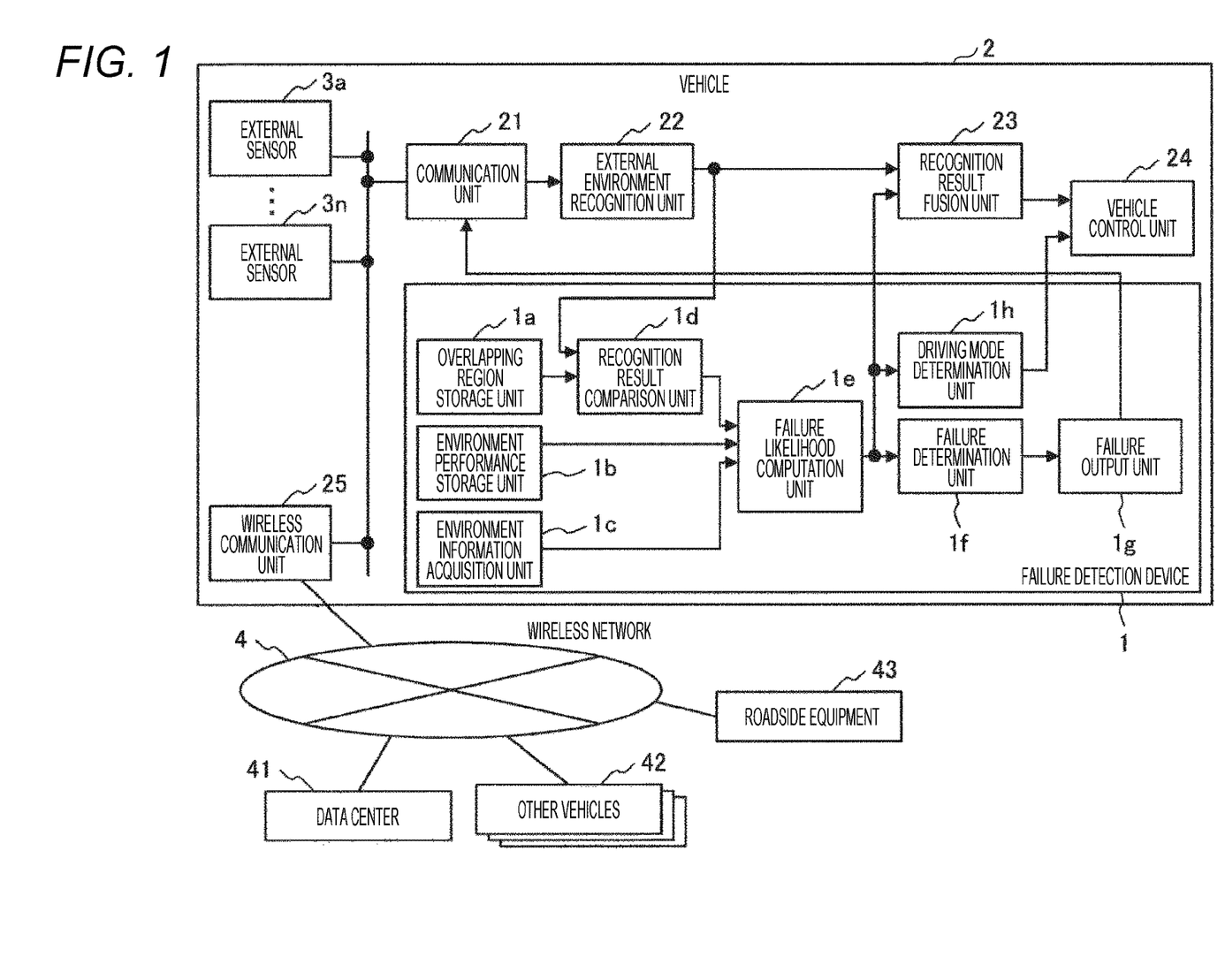
FIG. 1 is a block diagram illustrating a configuration of a vehicle provided with a failure detection device according to a first embodiment.

FIG. 1 is a function block diagram illustrating a configuration of a vehicle 2 provided with the failure detection device 1 according to the present embodiment.

As illustrated herein, in addition to the failure detection device 1, the vehicle 2 includes a communication unit 21, an external environment recognition unit 22, a recognition result fusion unit 23, a vehicle control unit 24, a wireless communication unit 25, and a plurality of external sensors 3 (3a to 3n) that detect the surrounding environment of the vehicle 2. Among these, the external sensors 3, the communication unit 21, and the wireless communication unit 25 are interconnected via a dedicated line inside the vehicle 2. Also, the wireless communication unit 25 is connected to a data center 41, other vehicles 42, roadside equipment 43, and the like through a wireless network 4 such as a mobile phone network.

The external environment recognition unit 22 recognizes the external environment of the vehicle 2 (such as other vehicles and pedestrians nearby, a region in which travel is possible, and signs or markings), based on measurement data of the surrounding environment obtained from the external sensors 3 via the dedicated line and the communication unit 21. For example, when one of the external sensors is a camera, the external environment described above is recognized by image processing and recognition technology or the like.

The failure detection device 1 accepts the external environment from the external environment recognition unit 22 as input, determines a failure in the external sensors 3 based on the external environment, and outputs information such as a determination result to the vehicle control unit 24. The failure detection device 1 includes an overlapping region storage unit 1a, an environment performance storage unit 1b, an environment information acquisition unit 1c, a recognition result comparison unit 1d, a failure likelihood computation unit 1e, a failure determination unit 1f, a failure output unit 1g, and a driving mode determination unit 1h. Note that in actuality, the failure detection device 1 is a computer provided with hardware including a computational device such as a CPU, a primary storage device such as semiconductor memory, an auxiliary storage device such as a hard disk, and the like. Furthermore, by causing the computational device to execute a program loaded into the primary storage device and store desired data in the auxiliary storage device, the functions of each unit described above are realized. In the following, the details of each unit will be described successively while omitting such known technology where appropriate.

<Overlapping Region Storage Unit 1a>

The overlapping region storage unit 1a is a database that stores overlapping regions D of detection areas Aa to An of the external sensors 3a to 3n. Hereinafter, the relationship between the installation locations of the external sensors 3 of the vehicle 2, the detection area A of each external sensor, and the overlapping regions D between the detection areas A will be described with reference to FIGS. 2A to 2C.

Figure 2A:
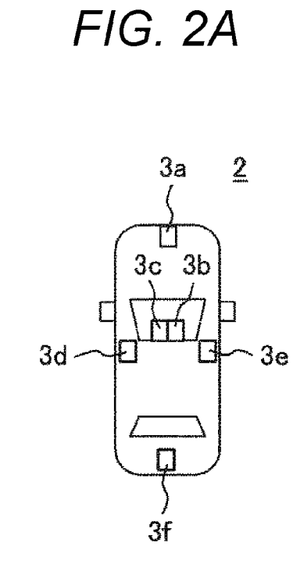
FIGS. 2A to 2C are diagrams each illustrating installation positions, detection areas, and overlapping regions of external sensors of a vehicle.

As illustrated in FIG. 2A, the vehicle 2 of the present embodiment has six external sensors 3a to 3f onboard. These external sensors form a sensor group combining different detection areas and sensing principles, such as a camera (single-lens camera or stereo camera), a laser rangefinder, and a millimeter-wave radar. The description herein will proceed by taking an example of a vehicle 2 having a millimeter-wave radar (external sensor 3a) installed on the front end, a camera (external sensor 3b) and a laser rangefinder (external sensor 3c) installed on an upper part of the windshield, and laser rangefinders (external sensors 3d, 3e, and 3f) installed on the sides and rear end.

Figure 2B:
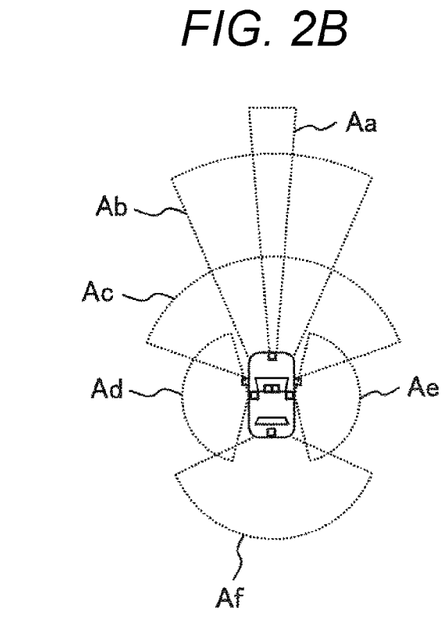

In the case of combining the external sensors 3 in this way, the detection areas Aa to Af of the external sensors 3a to 3f become fan-shaped as illustrated in FIG. 2B. In this case, the overlapping region storage unit 1a stores eight overlapping regions D illustrated in FIG. 2C. For example, an overlapping region Dab is the overlapping region of the detection areas Aa and Ab, while an overlapping region Dabc is the overlapping region of the detection areas Aa, Ab, and Ac.

<Environment Performance Storage Unit 1b>

The environment performance storage unit 1b is a database that stores the environment-dependent performance of the plurality of external sensors 3 onboard the vehicle 2. Hereinafter, an example of the environment-dependent performance of the external sensors 3 of the vehicle 2 will be described with reference to FIG. 3.

Each external sensor has favorable conditions and unfavorable conditions, which arise due to factors such as the sensing principle. For example, although a camera is excellent at recognizing pedestrians and from a cost perspective, the dynamic range is narrow, which causes the recognition accuracy to drop when exiting a tunnel or when under the intense glare of the afternoon sun. On the other hand, a millimeter-wave radar has high recognition accuracy even in rainy or foggy environments, but occasionally produces false positives due to interference with other millimeter-wave radars.

Figure 3:
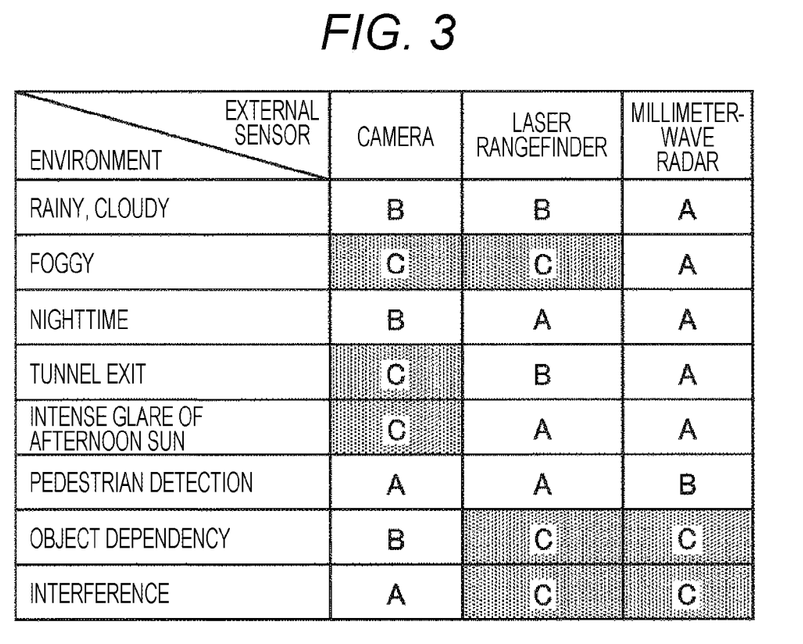
FIG. 3 is a table illustrating an example of environment-dependent performance of the external sensors of the vehicle.

In the environment performance storage unit 1b, the environment-dependent performance of the external sensors 3 onboard the vehicle 2 is stored by environment. In the example of FIG. 3, the environment-dependent performance for each environment of each external sensor is graded into the three categories of A ("Excellent" recognition accuracy), B ("Good" recognition accuracy), and C ("Fair" recognition accuracy), but the environment-dependent performance may also be classified more finely, and may also be quantified by assigning numerical values, such as 5 to A, 3 to B, and 1 to C. Additionally, in the case of quantifying the environment-dependent performance, a predetermined measurement standard may be provided, and the recognition accuracy with reference to the measurement standard may be expressed as a relative numerical value. Note that in cases such as where the external sensors 3 are of the same type but have different specifications, the environment-dependent performance may be stored for each specification.

<Environment Information Acquisition Unit 1c>

The environment information acquisition unit 1c acquires the weather, the road conditions, information about the position of the vehicle 2 itself, as well as position information about nearby vehicles as environment information for the vehicle 2. This environment information may be obtained from the external sensors 3a to 3n of the vehicle 2, or may be obtained from sources such as the data center 41, the other vehicles 42, and the roadside equipment 43 via the wireless network 4 and the wireless communication unit 25.

<Recognition Result Comparison Unit 1d>

The recognition result comparison unit 1d receives recognition information from each of the external sensors 3a to 3n output by the external environment recognition unit 22 and overlapping region information stored in the overlapping region storage unit 1a, and outputs a comparison result comparing the recognition results of the external sensors 3 related to each overlapping region D.

Figure 4:
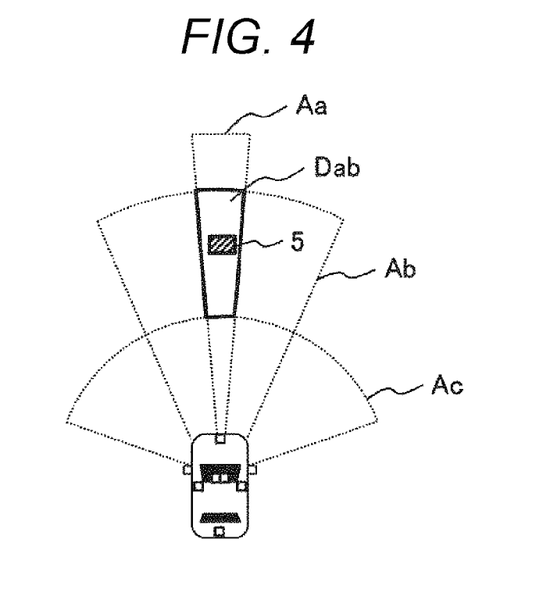
FIG. 4 is a diagram illustrating a positional relationship between an overlapping region of the detection areas of the external sensors of the vehicle, and a solid object.

For example, consider a case like in FIG. 4, in which the detection area Aa of the external sensor 3a (millimeter-wave radar) and the detection area Ab of the external sensor 3b (camera) overlap each other but do not overlap the detection area Ac of the external sensor 3c (laser rangefinder), and a solid object 5 exists in the overlapping region Dab. In this case, when the external sensors 3a and 3b are both operating normally, the solid object 5 is recognized by both of the external sensors 3a and 3b, and therefore the recognition result comparison unit 1d outputs the comparison result "Agreement". In contrast, in a case where one of the external sensors 3 is malfunctioning, the solid object 5 is recognized by one external sensor but is not recognized by the other, and therefore the recognition result comparison unit 1d outputs the comparison result "Disagreement".

<Failure Likelihood Computation Unit 1e>

The failure likelihood computation unit 1e receives the environment-dependent performance of each external sensor stored in the environment performance storage unit 1b, the environment information from the environment information acquisition unit 1c, and the comparison result from the recognition result comparison unit 1d, and computes a failure likelihood of each external sensor. At this point, the failure likelihood is an indicator indicating the possibility of a steadily ongoing abnormal state (a state of unsuccessful recognition or lowered recognition accuracy) in which repair is required due to a failure or misalignment in all or part of the external sensor 3. The failure likelihood is defined such that a larger value indicates a higher likelihood of failure.

Figure 5:
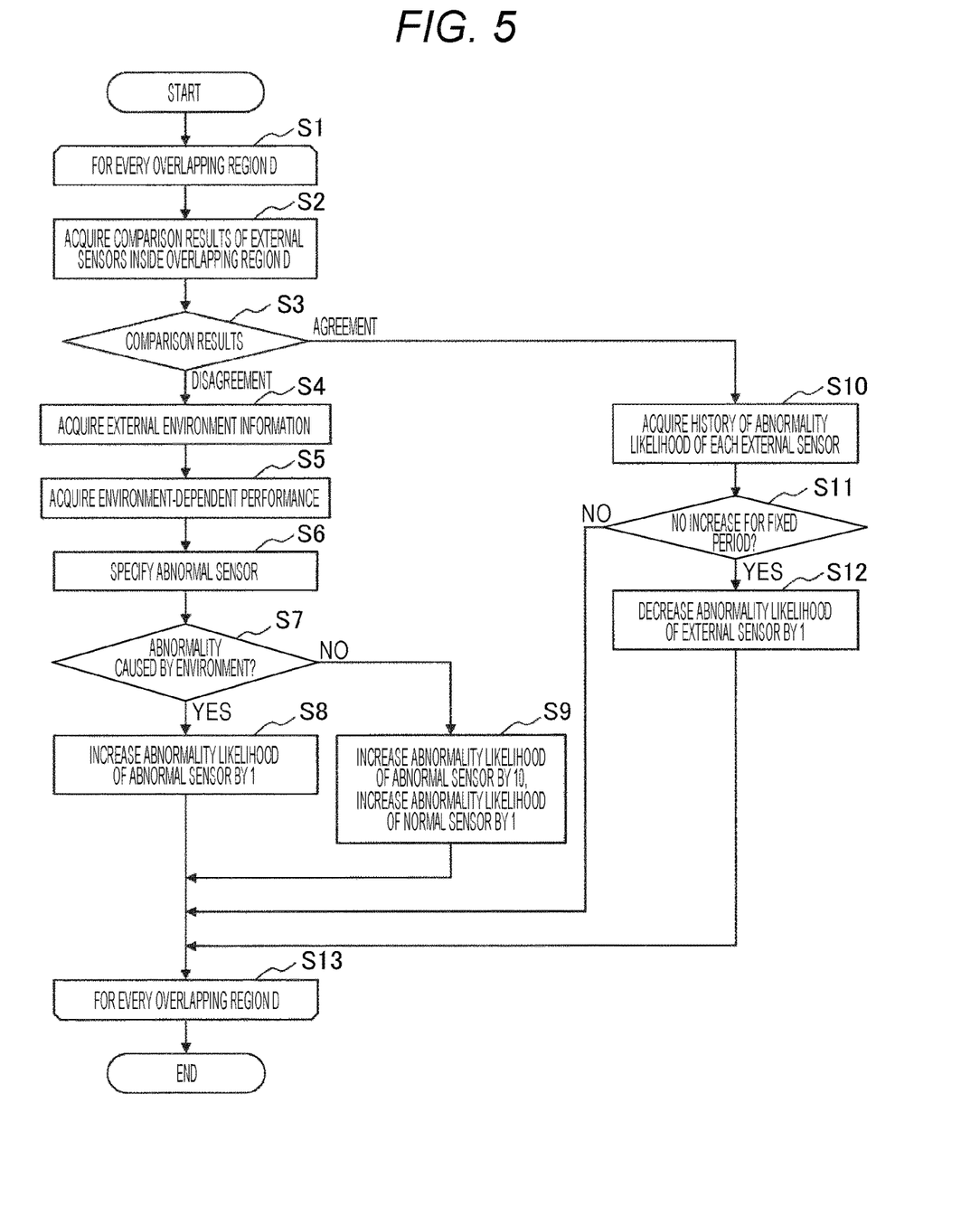
FIG. 5 is a flowchart illustrating the flow of a failure likelihood computation according to the first embodiment.

FIG. 5 is a flowchart illustrating the flow of a failure likelihood computation process by the failure likelihood computation unit 1e. This process is executed periodically in cooperation with the cycle of acquiring data from each of the external sensors or the operating cycle of the external environment recognition unit 22, for example.

Figure 2C:
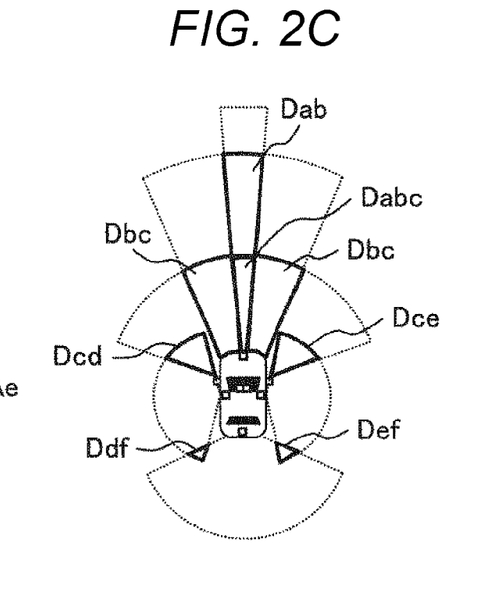

In the case in which a plurality of overlapping regions D exists like in FIG. 2C, the failure likelihood computation unit 1e executes the process enclosed by S1 and S13 for each overlapping region D.

First, the failure likelihood computation unit 1e acquires, from the recognition result comparison unit 1d, the comparison result of the external sensors 3 corresponding to the overlapping region D currently being processed (S2). Subsequently, it is determined whether the comparison result is "Agreement" or "Disagreement".

In the case where the comparison result in S3 is "Disagreement", the failure likelihood computation unit 1e acquires the environment information from the environment information acquisition unit 1c (S4), and also acquires the environment-dependent performance of each external sensor from the environment performance storage unit 1b (S5). Subsequently, based on this information, the failure likelihood computation unit 1e specifies the abnormal external sensor (that is, the sensor that is unsuccessful at recognition) (S6).

For example, in the case where the external sensors 3 corresponding to the overlapping region D being processed are the external sensor 3 (millimeter-wave radar) and the external sensor 3 (for example, a camera), and the presence of fog is confirmed from the environment information, the "Foggy" row in FIG. 3 is referenced, and the external sensor 3 (millimeter-wave radar) that performs well in a "Foggy" environment is treated as the normal sensor that has correctly recognized the surrounding environment, while the external sensor 3 (camera) that does not perform well in a "Foggy" environment is treated as the abnormal sensor that has incorrectly recognized the surrounding environment. On the other hand, in the case where the environment-dependent performance of the external sensors 3 is substantially the same, a method may be implemented in which the abnormal external sensor is taken to be the external sensor 3 of a lower priority set in advance according to properties such as the robustness of each external sensor, or in the case where there are three or more external sensors corresponding to the overlapping region D, a method may be implemented in which the abnormal external sensor is taken to be the external sensor with the minority recognition result according to a majority vote of the recognition results. The specifying method may also be changed according to factors such as the environment, position, and direction.

When the abnormal sensor is specified in S6, it is determined whether or not the abnormality is caused by the environment (S7). For example, in a case where it is possible to determine that the abnormality is clearly caused by the environment, such as when the overlapping region D is the overlapping region between the detection areas of a millimeter-wave radar and a camera, and the camera having subordinate environment-dependent performance in a "Foggy" environment is determined to be the abnormal sensor, an abnormality likelihood of the abnormal sensor is increased by 1 (S8), and the process with respect to the current overlapping region D ends. On the other hand, in a case where the environment-dependent performance is evenly matched between the external sensors and the abnormality is conceivably not caused by the environment, the abnormality likelihood of an abnormal sensor inferred to be producing a constant abnormality is increased by 10 while the abnormality likelihood of a normal sensor is increased by 1 (S9), and the process with respect to the current overlapping region D ends.

Note that because the flow proceeds to S9 in the case where the abnormality is conceivably caused by something other than the environment, the possibility that the external sensor 3 determined to be normal is actually abnormal and the external sensor 3 determined to be abnormal is actually normal cannot be ruled out. For this reason, the degradation in reliability is reflected by increasing the abnormality likelihood by 1 for the external sensor 3 determined to be normal. Also, in S8, the reason why the abnormality likelihood of the abnormal sensor is raised by the lesser degree of +1 compared to +10 in S9 is that an abnormality has occurred in an environment where such an abnormality is thought to occur as a matter of course, and therefore the abnormality is not overrated.

On the other hand, in the case where the comparison result in S3 is "Agreement", the failure likelihood computation unit 1*e* acquires a history of the abnormality likelihood of each external sensor corresponding to the current overlapping region D (S10), and checks whether each abnormality likelihood has not increased for a fixed period (S11). When the abnormality likelihood has not increased for the fixed period, the reliability of the external sensor is thought to be high, and therefore the abnormality likelihood of the external sensor is decreased by 1 (S12), and the process for the current overlapping region D ends. In the case where the abnormality likelihood of each external sensor has increased within the fixed period, the abnormality likelihood is left unchanged, and the process for the current overlapping region D ends.

Figure 6A:
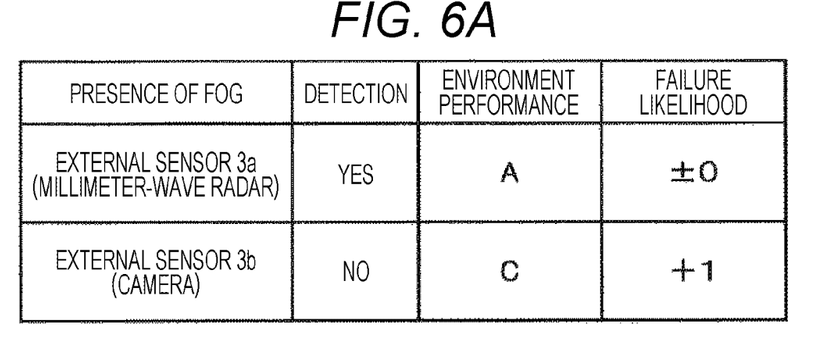
FIG. 6A is a diagram illustrating specific examples of the failure likelihood computation.
Figure 6B:
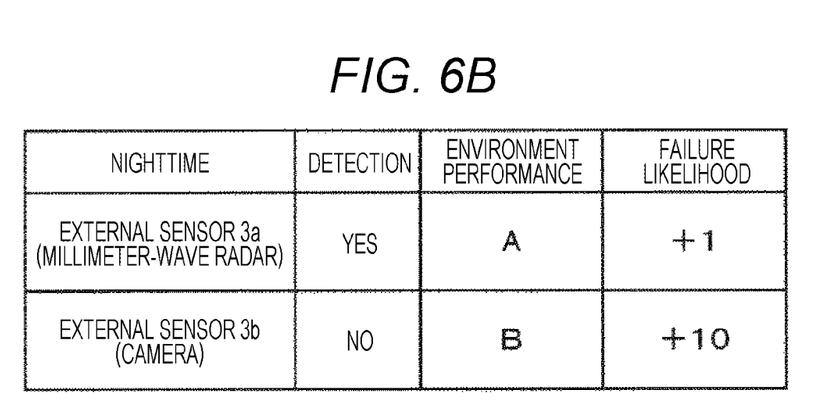
FIG. 6B is a diagram illustrating specific examples of the failure likelihood computation.

FIGS. 6A and 6B are tables illustrating specific examples of computing the failure likelihood. These tables are exemplary illustrations of the changes in the failure likelihood when, in the overlapping region Dab of FIG. 4, the solid object is successfully recognized by the external sensor 3*a* (millimeter-wave radar), but is not successfully recognized by the external sensor 3*b* (camera).

FIG. 6A is a specific example of computing the failure likelihood in an environment where the environment-dependent performance of one of the external sensors 3 becomes "C", such as in a "Foggy" environment, for example. According to FIG. 3, the environment-dependent performance with respect to "Foggy" is A for the millimeter-wave radar and C for the camera. Consequently, the camera that performs poorly in a "Foggy" environment is determined to be the abnormal sensor. In this case, the abnormality of the camera is thought to be a temporary abnormality that will be resolved if the "Foggy" environment is improved. For this reason, in light of the "temporary abnormality", the failure likelihood of the external sensor 3*b* (camera) is increased by just 1 in S8 of FIG. 5.

On the other hand, FIG. 6B is a specific example of computing the failure likelihood in an environment where the environment-dependent performance of neither external sensor 3 becomes "C", such as in a "Nighttime" environment, for example. According to FIG. 3, the environment-dependent performance with respect to "Nighttime" is A for the millimeter-wave radar and B for the camera. Consequently, although the "Nighttime" environment is not an unfavorable environment for either of the external sensors 3, the millimeter-wave radar with relatively better environment-dependent performance is specified as the normal sensor, while the camera with relatively worse environment-dependent performance is specified as the abnormal sensor. In this way, in cases where the recognition results disagree in an environment where both recognition results are trustworthy, one of the external sensors 3 is thought to be producing a constant abnormality. For this reason, in light of the "constant abnormality", the failure likelihood of the normal sensor is increased by 1 while the failure likelihood of the abnormal sensor is increased by 10 in S9 of FIG. 5. Note that the above increase values "1" and "10" may be adjustable to be appropriate for practical use, and may be settable from the data center 41, for example.

<Failure Determination Unit 1*f*>

The failure determination unit 1*f* determines a failure in each of the external sensors 3*a* to 3*n* based on each failure likelihood computed by the failure likelihood computation unit 1*e*.

Figure 7:
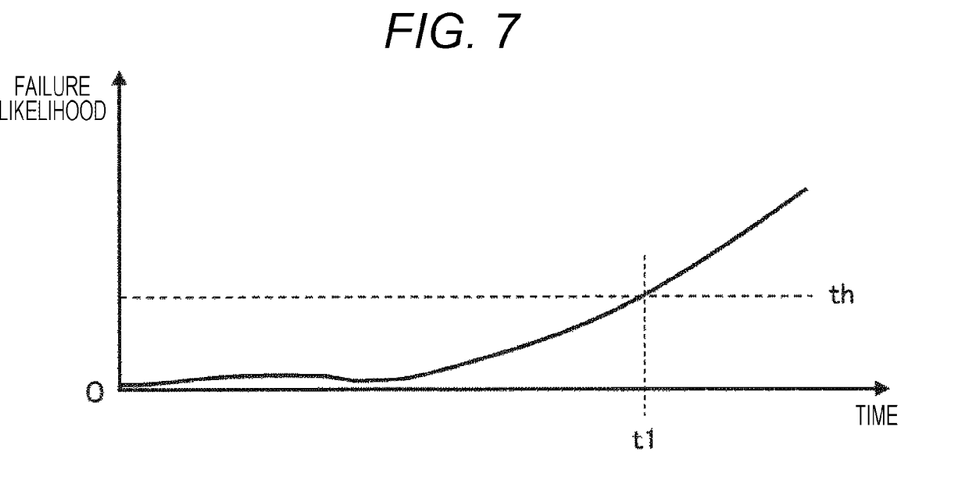
FIG. 7 is a diagram illustrating an example of a failure likelihood trend for an external sensor of a vehicle.

FIG. 7 illustrates an example of a temporal trend in the failure likelihood of a certain external sensor 3. Although the external sensor 3 includes periods in which the failure likelihood decreases, the failure likelihood increases over the long term, and after a threshold value th is exceeded at a time t1, the slope of the increase rises even further. The threshold value th is a threshold value used by the failure determination unit 1*f* to determine a failure, and when the value of the failure likelihood becomes higher than the threshold value th, the failure determination unit 1*f* determines that there is a failure in the external sensor 3. With this arrangement, in the case where the failure likelihood rises suddenly due to abnormalities (unsuccessful recognition) not caused by the environment, a failure is detected early, while in addition, even if abnormalities are thought to be caused by the environment, if the abnormalities seem to be occurring frequently, the failure likelihood accumulates and a failure can be determined. Note that a standardized value may be used as the threshold value th for each of the external sensors 3*a* to 3*n*, or a separate threshold value may be set for every external sensor. Additionally, rather than simply making a determination by setting a threshold value on the value of the failure likelihood like in FIG. 7, factors such as the slope of the trend graph and changes in the slope may also be considered to make a comprehensive failure determination.

<Failure Output Unit 1*g*>

The failure output unit 1*g* receives failure determination information from the failure determination unit 1*f*, and informs the driver of the vehicle 2 and a repair facility or the like through the communication unit 21.

<Driving Mode Determination Unit 1*h*>

The driving mode determination unit 1*h* determines one or more driving modes adoptable by the vehicle 2 based on the failure likelihood of each external sensor output by the failure likelihood computation unit 1*e*. For example, in the case where the failure likelihood is high for the external sensor 3*a* (millimeter-wave radar) capable of detecting farther than the other external sensors, the driving mode is set to a low-speed driving mode that performs automatic driving by dropping down to a speed that can be handled by sensors such as the external sensor 3*b* (camera) with a low failure likelihood. Also, in the case where the failure likelihood is high for the external sensor 3*d* capable of detecting in the horizontal direction of the vehicle 2, the driving mode is set to a driving mode that performs automatic driving by limiting the situations where a lane change can be performed.

<Recognition Result Fusion Unit 23>

The recognition result fusion unit 23 combines (fuses) the recognition results regarding the external environment from the external sensors 3 having different detection areas and detection methods, and generates environment information. At this time, the fusion process is switched in consideration of the failure likelihood of each external sensor 3 computed by the failure likelihood computation unit 1*e*. For example, in the case where an external sensor 3 having a high failure likelihood exists, the recognition result from that external sensor 3 is not included in the fusion, and is instead replaced by a recognition result from another external sensor.

<Vehicle Control Unit 24>

The vehicle control unit 24 controls travel by selecting an appropriate driving mode from among the driving modes adoptable by the vehicle 2 determined by the driving mode determination unit 1h based on the external recognition information output by the recognition result fusion unit 23.

According to the failure detection device 1 of the present embodiment described above, by comparing the recognition results from a plurality of external sensors 3 in an overlapping region D of the detection areas A of each of the external sensors, an abnormality (unsuccessful recognition) in an external sensor can be detected in real time.

Also, according to the failure detection device 1 of the present embodiment, in a case where the recognition results from the plurality of external sensors 3 are different in the overlapping region of the detection areas A of each of the external sensors, the abnormal sensor is specified based on the current environment information and the environment-dependent performance of each external sensor relative to each other. Additionally, it is determined whether or not the abnormality in the external sensor is caused by the environment, the likelihood of failure (a steadily ongoing abnormal state in which repair is required due to a failure or misalignment in all or part of the external sensor) is computed, and the failure in the external sensor is determined based on the likelihood of failure. With this arrangement, it is possible to distinguish between an abnormality and a failure in an external sensor, and unnecessary canceling of automatic driving (such as switching to manual driving by the driver) can be prevented.

Also, according to the failure detection device 1 of the present embodiment, an adoptable driving mode is determined based on the failure likelihood of the external sensors 3. With this arrangement, it is possible to extend the cruisable distance of automatic driving without driver intervention as far as possible.

Second Embodiment

Next, a failure detection device 1 according to a second embodiment of the present invention will be described according to FIGS. 8 and 9. Note that duplicate description will be omitted for points shared in common with the first embodiment.

When computing the failure likelihood, the failure likelihood computation unit 1e of the present embodiment not only considers the environment-dependent performance of the external sensors like in the first embodiment, but also considers an abnormality record that stores an abnormality occurrence history of the other vehicles 42 in association with environment information (such as position and weather) at the time of each abnormality.

Figure 8:
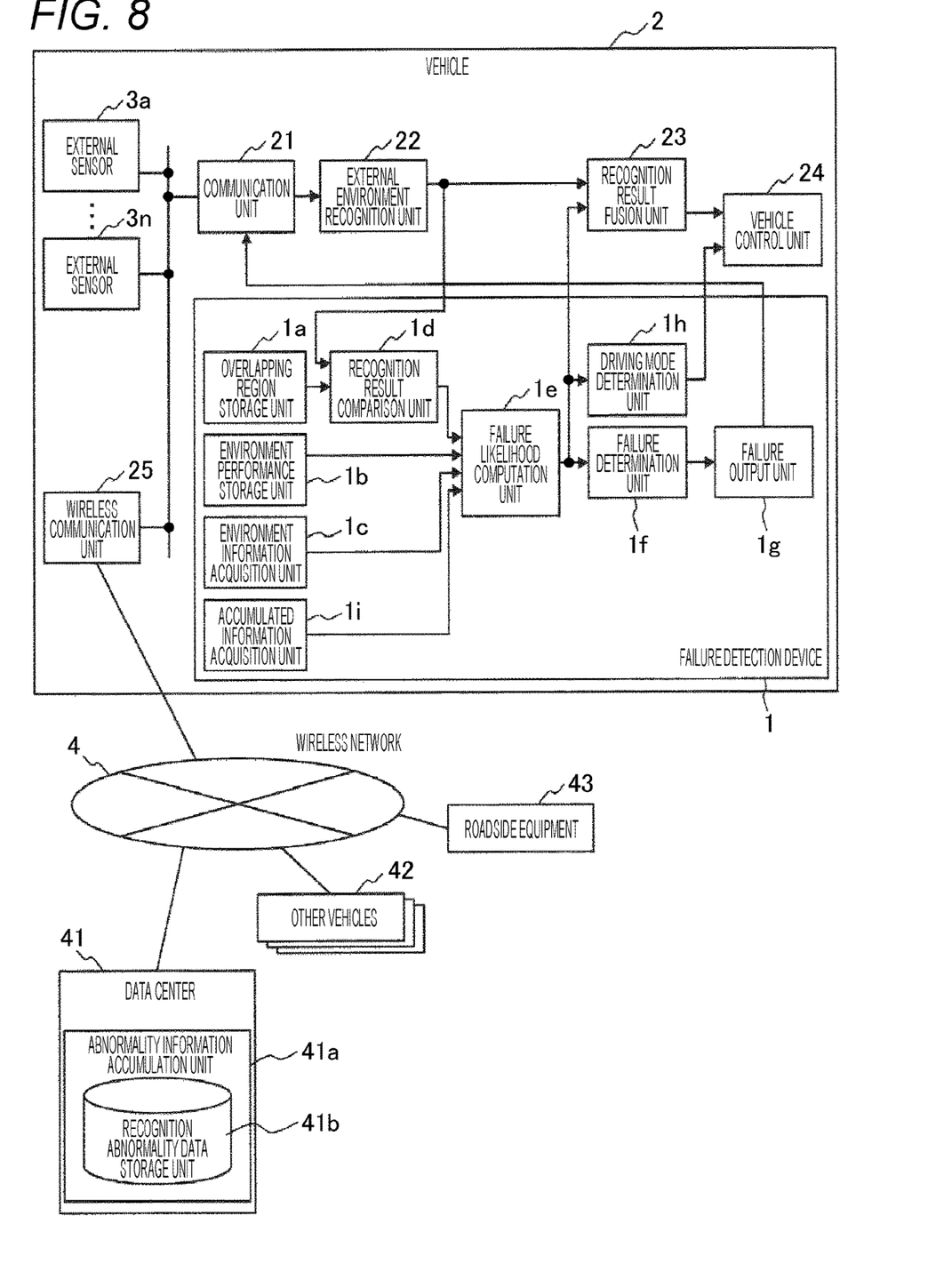
FIG. 8 is a block diagram illustrating a configuration of a failure detection device according to a second embodiment.

FIG. 8 is a diagram illustrating a configuration of the failure detection device 1 according to the second embodiment. The differences from FIG. 1 are that an accumulated information acquisition unit 1i is added to the failure detection device 1, the output of which is input into the failure likelihood computation unit 1e, and the existence of an abnormality information accumulation unit 41a and a recognition abnormality data storage unit 41b internal to the data center 41 is explicitly indicated.

The abnormality information accumulation unit 41a of the data center 41 collects sensor information, position information, and environment information when an abnormality occurs (when recognition is unsuccessful) in the external sensors 3 of the other vehicles 42, and accumulates the collected information in the recognition abnormality data storage unit 41b. With this arrangement, a database is constructed in which abnormalities of the external sensors 3 collected from a large number of vehicles are accumulated in association with position information about the abnormalities.

As a result, the accumulated information acquisition unit 1i of the vehicle 2 can acquire data about the other vehicles 42 accumulated in the abnormality information accumulation unit 41a of the data center 41, and cause the acquired data to be reflected in the computation of the failure likelihood in the failure likelihood computation unit 1e.

Figure 9:
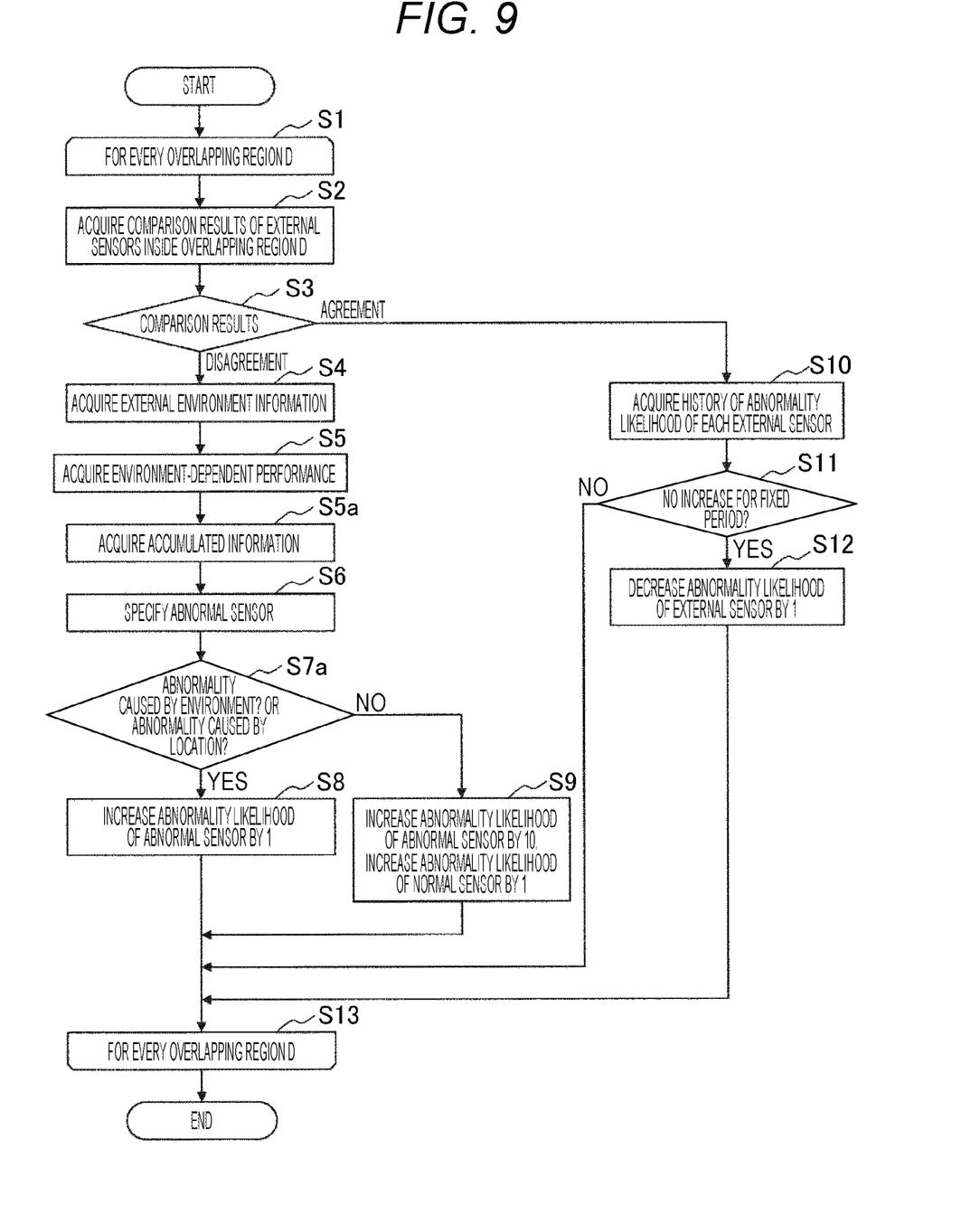
FIG. 9 is a flowchart illustrating the flow of a failure likelihood computation according to the second embodiment.

FIG. 9 is a flowchart illustrating the flow of the failure likelihood computation by the failure likelihood computation unit 1e in the present embodiment. The changes from the flowchart in the first embodiment described with respect to FIG. 5 are that S5a is added between S5 and S6, and S7 is replaced with S7a.

In S5a, the recognition abnormality data accumulated in the abnormality information accumulation unit 41a of the data center 41 is searched to acquire the data closest to the position of the vehicle 2 itself. With this arrangement, information about abnormalities of the external sensors 3 that readily occur near the current position of the vehicle can be acquired.

In S7a, in addition to the determination of whether or not the abnormality is caused by the environment similar to the first embodiment, it is also determined whether or not the abnormality is caused by the location. For example, even if the abnormality is not determined to be caused by the environment, if the same type of abnormality of the external sensors occurs often near the position of the vehicle itself (regardless of whether the abnormality occurs in the vehicle itself or in other vehicles), the abnormality is determined to be caused by the location.

Note that although the abnormality is treated as being caused by the location in the present embodiment, in the case where a tendency of a characteristic external sensor abnormality is observed with respect to a temporary factor, such as a specific environment or the direction of the vehicle, the abnormality does not have to be limited to being caused by the location, and it is sufficient to determine whether or not the abnormality is caused by the factor. These factors may be discovered through the analysis of big data related to external sensing abnormalities stored in the recognition abnormality data storage unit 41b of the data center 41.

According to the failure detection device 1 of the present embodiment described above, abnormalities and failures can be distinguished by considering not only the known environment-dependent performance of external sensors as illustrated in FIG. 3, but also changes in the performance of the external sensors in characteristic locations and environments not yet formally understood.

Note that the present invention is not limited to the above embodiments, and includes a variety of modifications. For example, the above embodiments are described in detail to make the present invention easy to understand, but are not necessarily limited to being provided with all of the configuration described above. Additionally, it is possible to replace part of an embodiment with the configuration of another embodiment, and it is furthermore possible to add the configuration of an embodiment to the configuration of another embodiment. Also, part of the configuration of each embodiment may be added to, removed from, or replaced by another configuration. In addition, each configuration, function, processing unit, processing format, and the like described above may also be realized, in whole or in part, by hardware through the design of an integrated circuit, for example. Each configuration, function, and the like described above may also be realized by software by causing a processor to interpret and execute programs that achieve respective functions. Information such as one or more programs, tables, and files that achieve each function can be placed in memory, a recording device such as a hard disk or a solid-state drive (SSD), or in a recording medium such as an IC card, an SD card, or a DVD.

What is claimed is:

1. A failure detection device that detects a failure in a plurality of external sensors onboard a vehicle, the failure detection device comprising:
    an overlapping region storage unit that stores an overlapping region of detection areas of the plurality of external sensors;
    an environment performance storage unit that stores an environment-dependent performance of sensing of the plurality of external sensors;
    an environment information acquisition unit that acquires environment information about the vehicle;
    a recognition result comparison unit that compares recognition results of an object in the overlapping region from the plurality of external sensors;
    a failure likelihood computation unit that computes a failure likelihood of each of the external sensors based on comparison results of the recognition results, the environment information, and the environment-dependent performance; and
    a failure determination unit that determines a failure in each of the external sensors based on the failure likelihood of each of the plurality of external sensors.

2. The failure detection device according to claim 1, wherein
    the failure determination unit determines that a failure occurs in one of the external sensors when a cumulative value of the failure likelihood for the external sensor exceeds a predetermined threshold value.

3. A failure detection device that detects a failure in a plurality of external sensors onboard a vehicle, the failure detection device comprising:
    an overlapping region storage unit that stores an overlapping region of detection areas of the plurality of external sensors;
    an environment performance storage unit that stores an environment-dependent performance of sensing of the plurality of external sensors;
    an environment information acquisition unit that acquires environment information about the vehicle;
    a recognition result comparison unit that compares recognition results of an object in the overlapping region from the plurality of external sensors;
    a failure likelihood computation unit that computes a failure likelihood of each of the external sensors based on comparison results of the recognition results, the environment information, and the environment-dependent performance; and
    a driving mode determination unit that determines one or more driving modes of automatic driving adoptable by the vehicle based on the failure likelihood of each of the plurality of external sensors.

4. The failure detection device according to claim 3, wherein
    the driving mode determination unit determines the driving mode according to the failure likelihood of each of the external sensors and the detection area of each of the external sensors.

5. The failure detection device according to claim 1, wherein
    when each of the external sensors in the overlapping region has a different object recognition result, the failure likelihood computation unit determines that the external sensor having subordinate environment-dependent performance with respect to the environment information is an abnormal sensor, and
    increases the failure likelihood for the abnormal sensor.

6. The failure detection device according to claim 5, wherein
    the failure likelihood computation unit
    increases the failure likelihood by a small value in a case of unsuccessful recognition in an environment for which the abnormal sensor exhibits low environment-dependent performance, and
    increases the failure likelihood by a large value in a case of unsuccessful recognition in an environment for which the abnormal sensor exhibits high environment-dependent performance.

7. The failure detection device according to claim 1, wherein
    a wireless communication unit provided in the vehicle acquires, over a wireless network, data corresponding to a current environment of the vehicle from among data storing past unsuccessful recognitions in at least one different vehicles in association with a contemporaneous environment accumulated in a data center, and increases the failure likelihood when a plurality of abnormalities have previously occurred in the current environment of the vehicle.

8. The failure detection device according to claim 7, wherein
    an increase value in the failure likelihood computed by the failure likelihood computation unit is updated in the data center.

9. A failure detection method that detects a failure in a plurality of external sensors onboard a vehicle, the failure detection method comprising:
    a first step of acquiring environment information about the vehicle;
    a second step of comparing detection results of an object in an overlapping region of detection areas of the plurality of external sensors, based on the overlapping region stored in advance, an environment-dependent performance dependent on an external environment of the plurality of external sensors stored in advance, and the environment information acquired in the first step;
    a third step of specifying an external sensor having an incorrect detection result as an abnormal sensor when, in the second step, detection results of the object are different among the external sensors;
    a fourth step computing a failure likelihood with respect to the abnormal sensor specified in the third step based on the environment-dependent performance, the failure likelihood acting as an indicator that indicates a possibility of a state in which repair is required;
    a fifth step of determining a failure in the abnormal sensor based on a comparison between a cumulative value of the failure likelihood computed in the fourth step and a predetermined threshold value; and a sixth step of determining one or more driving modes of automatic driving adoptable by the vehicle from the cumulative value of the failure likelihood computed in the fourth step and the detection areas of the external sensors.

10. The failure detection device according to claim 3, wherein
when each of the external sensors in the overlapping region has a different object recognition result, the failure likelihood computation unit determines that the external sensor having subordinate environment-dependent performance with respect to the environment information is an abnormal sensor, and increases the failure likelihood for the abnormal sensor.

11. The failure detection device according to claim 3, wherein
a wireless communication unit provided in the vehicle acquires, over a wireless network, data corresponding to a current environment of the vehicle from among data storing past unsuccessful recognitions in at least one different vehicle in association with a contemporaneous environment accumulated in a data center, and increases the failure likelihood when a plurality of abnormalities have previously occurred in the current environment of the vehicle.

* * * * *